(12) United States Patent
Koller et al.

(10) Patent No.: US 9,015,808 B1
(45) Date of Patent: Apr. 21, 2015

(54) RESTRICTING MOBILE DEVICE SERVICES BETWEEN AN OCCURRENCE OF AN ACCOUNT CHANGE AND ACQUISITION OF A SECURITY CODE

(75) Inventors: Gary Duane Koller, Overland Park, KS (US); Raymond Emilio Reeves, Olathe, KS (US); Simon Youngs, Overland Park, KS (US); Mark Douglas Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 114 days.

(21) Appl. No.: 13/546,786

(22) Filed: Jul. 11, 2012

(51) Int. Cl.
*H04L 9/32* (2006.01)
*H04L 29/06* (2006.01)

(52) U.S. Cl.
CPC ................................ *H04L 29/06857* (2013.01)

(58) Field of Classification Search
None
See application file for complete search history.

(56) References Cited

U.S. PATENT DOCUMENTS

| | | | |
|---|---|---|---|
| 7,010,699 B1 * | 3/2006 | Agarwal et al. | 726/5 |
| 2001/0036273 A1 * | 11/2001 | Yoshizawa | 380/247 |
| 2002/0087891 A1 * | 7/2002 | Little et al. | 713/202 |
| 2002/0087894 A1 * | 7/2002 | Foley et al. | 713/202 |
| 2005/0197104 A1 * | 9/2005 | Liu et al. | 455/411 |
| 2005/0198534 A1 * | 9/2005 | Matta et al. | 713/201 |
| 2007/0143825 A1 * | 6/2007 | Goffin | 726/2 |
| 2007/0234410 A1 * | 10/2007 | Geller | 726/8 |
| 2008/0120711 A1 * | 5/2008 | Dispensa | 726/7 |
| 2009/0094351 A1 * | 4/2009 | Gupta et al. | 709/220 |

* cited by examiner

*Primary Examiner* — David Le (57) ABSTRACT

Systems, methods, and computer-readable media for restricting mobile device services between an occurrence of an account change and an acquisition of a security code. The method includes recognizing that a low level of security is in effect in association with a user device, or a set of credentials associated therewith. In accordance with the low level of security, an indication is provided to restrict one or more services initially provided for the user device, or the set of credentials associated therewith. In addition, an indication is provided to initiate an authentication event. Performance of such an authentication event results in the user device, or the set of credentials associated therewith, obtaining a security code that results in application of an increased level of security in effect in association with the user device, or the set of credentials associated therewith.

20 Claims, 5 Drawing Sheets

RESTRICTING MOBILE DEVICE SERVICES BETWEEN AN OCCURRENCE OF AN ACCOUNT CHANGE AND ACQUISITION OF A SECURITY CODE

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, restricting mobile device services between an occurrence of an account change or device swap and an acquisition of a security code. Utilizing embodiments hereof, upon an account change (e.g., a device swap) that requires a mobile device to obtain a valid security code (e.g., shared secret data (SSD)), services provided to the mobile device are restricted until the mobile device obtains a valid security code. Further, the mobile device can be provided with a notification to perform or initiate an authentication event to obtain a valid security code. Upon acquisition of a valid security code, the service restrictions applied to the mobile device are removed.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for restricting mobile device services between an account change and acquisition of a security code. Utilizing embodiments hereof, upon an account change (e.g., a device swap) that requires a mobile device to obtain a valid security code (e.g., shared secret data (SSD)), services provided to the mobile device are restricted until the mobile device obtains a valid security code. Further, the mobile device can be provided with a notification to perform or initiate an authentication event to obtain a valid security code. After a valid security code is acquired, the service restrictions applied to the mobile device are removed.

Accordingly, in one aspect, the present invention is directed to one or more computer-readable storage media having computer-executable instructions embodied thereon that, when executed, perform a method for restricting mobile device services between an occurrence of an account change and an acquisition of a security code. The method includes recognizing that a low level of security is in effect in association with a user device, or a set of credentials associated therewith. In accordance with the low level of security, an indication is provided to restrict one or more services initially provided for the user device, or the set of credentials associated therewith. An indication is also provided to initiate an authentication event. Performance of the authentication event results in the user device, or the set of credentials associated therewith, obtaining a security code that results in application of an increased level of security in effect in association with the user device, or the set of credentials associated therewith.

In another aspect, embodiments of the present invention are directed to one or more computer-readable storage media having computer-executable instructions embodied thereon that, when executed, perform a method for restricting mobile device services between an occurrence of an account change and an acquisition of a security code. The method includes receiving an authentication notification at a user device that requests initiation of an authentication event to initiate authentication of the user device, wherein the authentication notification is provided to the user device based on the user device being void of a valid security code. In response to initiating the authentication event, authentication of the user device is performed to acquire a valid security code in association with credentials corresponding with the user device.

In yet another aspect, a system for restricting mobile device services between an occurrence of an account change and an acquisition of a security code. The system includes a service restrictor configured to recognize that a security code is not associated with a user device, provide an indication to restrict one or more voice or data services for the user device, and provide an indication to initiate authentication for the user device. The system also includes a notification component configured to receive the indication to initiate authentication for the user device and, in response, initiating authentication for the user device by initiating a voice call to the user device or communicating an authentication notification to the user device that requests the user of the user device to initiate a voice call.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

- 3G Third Generation Mobile Telecommunications
- 4G Fourth Generation Mobile Telecommunications
- CD-ROM Compact Disk Read Only Memory
- CDMA Code Division Multiple Access
- GPRS General Packet Radio Service
- GSM Global System for Mobile communications: originally from Groupe Spécial Mobile
- DVD Digital Versatile Discs
- EEPROM electrically Erasable Programmable Read Only Memory
- HLR Home Location Register
- HSDPA High-Speed Downlink Packet Access
- LTE Long Term Evolution
- PC Personal Computer
- PDA Personal Digital Assistant
- RAM Random Access Memory
- TDMA Time Division Multiple Access
- SSD Shared Secret Data
- UMTS Universal Mobile Telecommunications System
- VOIP Voice Over Internet Protocol
- WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
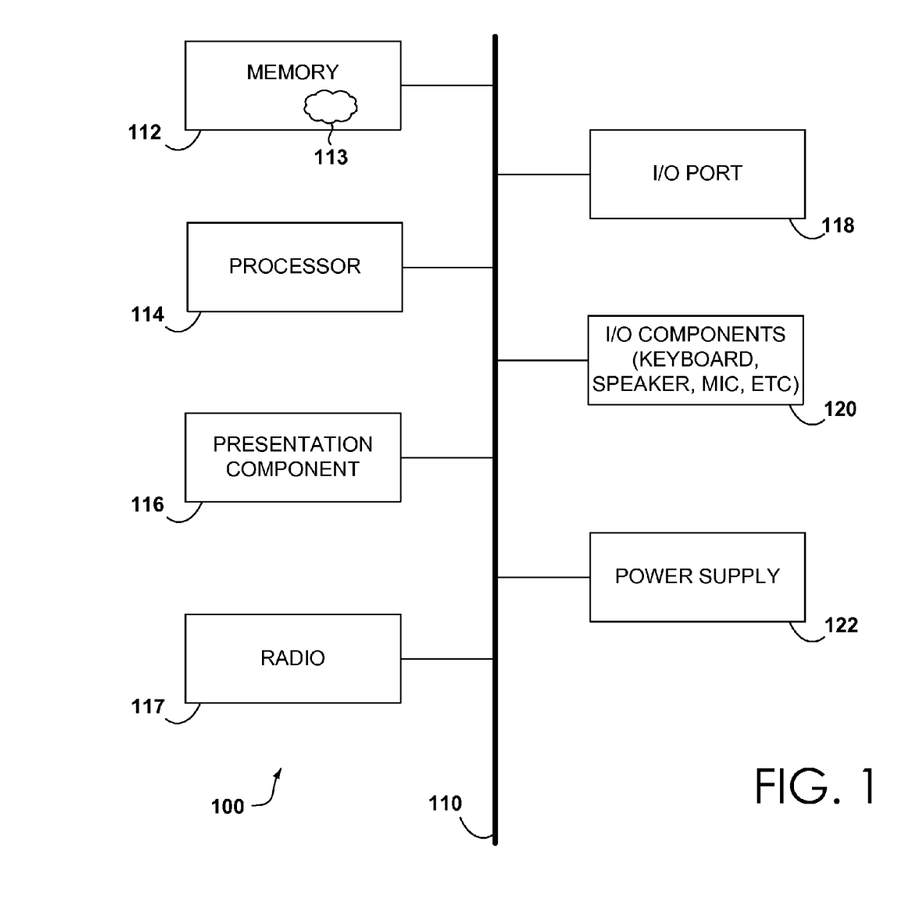
FIG. 1 depicts an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for restricting mobile device services between an occurrence of an account change and acquisition of a security code. Accordingly, embodiments of the present invention facilitate mitigation of fraudulent activity between an occurrence of an account change and acquisition of a security code. Fraudulent activity, as used herein, refers to technical cloning of credentials of a mobile device, such as an electronic serial number (ESN), mobile station identifier (MSID), mobile device number (MDN), and/or the like, and utilization thereof. For instance, an ESN can be cloned and utilized by another device to fraudulently obtain voice and/or data services.

More recently, fraudsters have been performing fraudulent activity (i.e., technical cloning and utilization in association therewith) between the time a customer performs a device swap and attains a valid security code (e.g., SSD). In this regard, when a customer switches their account from association with one device to association with another device (e.g., a new device, another used device, a different device, or the like), a fraudster might clone the credentials and utilize such credentials to obtain fraudulent services, such as data and/or voice services. For example, when a legitimate customer does a device swap to a new or different device, fraudulent calls can occur by a fraudster until the customer uses a service requiring a traffic channel (e.g., makes a voice call on the new device and successfully attains a valid SSD value). In another example, a fraudster might set up a valid account in association with a device and perform device swaps in association with his or her own account. In this way, the fraudster will avoid making a call or otherwise utilizing the swapped to device as the fraudster can perform fraudulent activities until the swapped to device obtains a valid shared secret data (SSD) value. In yet another example, a fraudster might hack into a subscriber account to perform swaps so that he or she can then clone credentials and make fraudulent calls. Accordingly, a fraudster might initiate a brief or temporary device swap to reset the credentials or user account of the legitimate device in the network. Such an action can provide a period of time until the legitimate device establishes a valid SSD. During such a time period, the credentials (e.g., ESN, MSID, and MDN) can be cloned and utilized by a fraudster.

By way of example only, assume that a customer acquires a new mobile device and thereby switches voice and/or data services from his or her old device to his or her new device. Prior to utilization of the new device, the new device has not yet attained a valid security code. A security code refers to a value in the authentication process that identifies a valid device on the network. In one embodiment, a security code is a SSD. Accordingly, fraudsters have utilized this time period as a "window of opportunity" to clone credentials and utilize unauthorized services, such as voice and/or data services. Upon the new device obtaining a valid security code, such as a SSD, the fraudster can be prevented from fraudulent activity via voice authentication protocol (e.g., CDMA voice authentication protocol).

As such, the span of time between performance of an occurrence of a device swap (or account change) and acquisition of a valid security code might be more vulnerable to fraudulent activities as, for example, voice authentication protocols prevent technical cloning after a valid SSD value is obtained. Accordingly, embodiments of the present invention are directed to automatically restricting services (e.g., voice and/or data services) between recognition of a device swap (or account change) and acquisition of a valid security code for the newly used mobile device.

Figure 2:
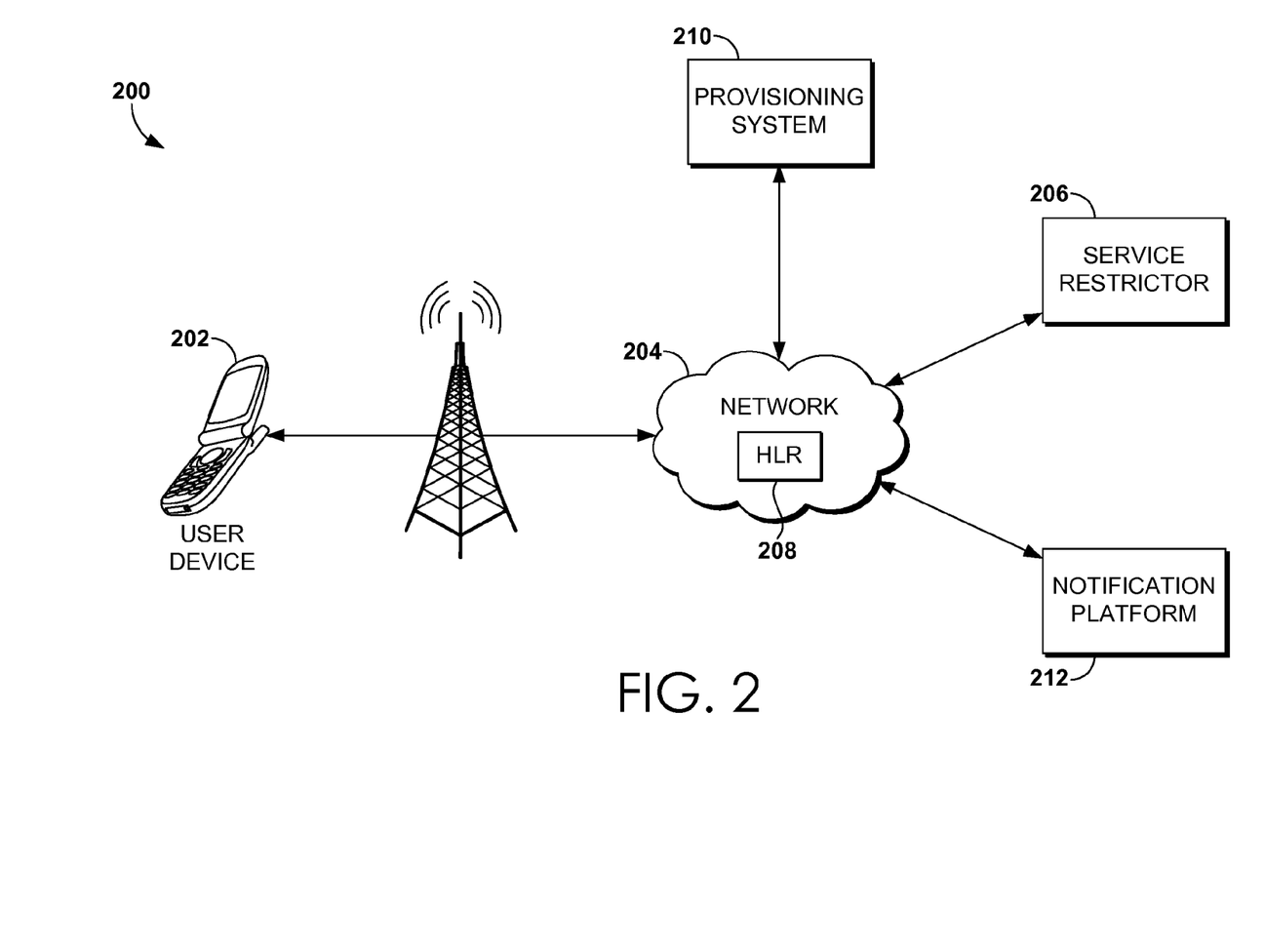
FIG. 2 is a schematic view of an exemplary network environment suitable for use in implementing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 can utilize network 204 to communicate with other computing devices (e.g., a mobile device(s), a server(s), a personal computer(s), etc.). In embodiments, the network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. The network 204 can be part of a telecommunication network that connects subscribers to their immediate service provider. In embodiments, the network 204 can be associated with a telecommunications provider that provides services to user devices, such as user device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

The user device 202 of FIG. 2 is illustrated as the newly swapped device. As previously described, in some cases, the newly swapped device might be a new, used, or different mobile device to which a legitimate customer switched to begin utilizing voice and/or data services. In other cases, the newly swapped device might be a new, used, or different mobile device to which a fraudster transfers his or her legitimate account to reset the security status to a low security such that credentials can be cloned and utilized to effectuate fraudulent activities. In yet other cases, the newly swapped device might be the same device previously used by a legitimate customer that in effect performs as though it is a newly acquired device. That is, an account associated with a mobile device might be temporarily switched to another device and returned to the original device such that the original device acts as a newly swapped to device.

The user device 202 (i.e., newly swapped device) is assigned an authentication key (A-key) value. Such an authentication key value can be embedded into a device, for example, during manufacture of the device. The network 204, or a portion thereof, can utilize the authentication key as a check to verify the mobile device. If the authentication key is verified (e.g., matches a stored authentication key), a valid shared secret data (SSD) can be provided or derived for the mobile device. Obtaining a SSD can prevent cloning of the newly swapped device 202, for example, by way of CDMA voice authentication protocol. In this regard, upon obtaining a SSD, high security of the mobile device is implemented to prevent cloning of device or customer credentials. Prior to obtaining a SSD, low security implementation may be employed allowing a fraudster to clone credentials (e.g., ESN, MSID, and/or MDN) and utilize such credentials to access voice and/or data services. As such, embodiments described herein restrict services prior to a valid security code being obtained.

In implementation, the service restrictor 206 initiates restriction of services for devices between an occurrence of a device swap or account change and acquiring a security code for the swapped to device. To do so, the service restrictor 206 recognizes or identifies an occurrence of a device swap, an account change, or a low security implementation.

In accordance with an occurrence of a device swap, a user account associated with one device is transferred to another device. As such, credentials associated with a device or user are transferred from association with one device to another. In embodiments, in accordance with a device swap or user account transfer, a security status associated with the user device 202 is set. As such, a security status of a newly swapped to device is modified, established, or designated as a low security level. In effect, a security status designated as low results in the newly used device negotiating a security code, as described more fully below. Accordingly, the service restrictor 206 can recognize, detect, or identify a device swap, an account change, or a low security implementation.

In some cases, a security indicator is utilized to recognize a device swap, an account change, or a low security implementation. A security indicator can indicate a device swap, an account change, or a security status of a device (e.g., low or high), or credentials associated therewith. Stated differently, a security indicator can indicate whether a security level is low or high for a device or credential(s) or whether a valid security code has been obtained in association with a device or credential(s). Such a security indicator can be any indication provided in any manner (e.g., yes/no, true/false, high/low, 0/1, etc.). For example, a security indicator may indicate a "low" security level, may indicate that a valid security code (e.g., SSD) has "not" been obtained, or any code, value, symbol or other indication of a security status associated with a user device or set of credentials (e.g., a valid security code has not been acquired following a device swap or account change). By contrast, a security indicator may indicate a "high" security level, may indicate that a valid security code has been obtained (e.g., "yes"), or the like, when a valid security code has been acquired in association with a device or credentials.

In some instances, a security indicator is modified to an indication of low security level or an indication that a SSD has not been obtained based on credentials associated with a device or customer being transferred to association with another device or customer. In other instances, a user account associated with a device can be temporarily shifted from the initial device to another device and, thereafter, returned to the initial device. Such a temporary shift and/or return to the original device can effectuate a low security level to be associated with the user device. That is, the security indicator of the legitimate device can be reset (e.g., modified to a low security level) in the network resulting in the original device being required to negotiate a security code (e.g., SSD value).

A security indicator indicating a security status (e.g., level of security or acquisition of a security code) for a mobile device can be provided and/or modified, for example, in the HLR 208. HLR 208 can include an authentication center that contains a subscriber authentication record(s). Such a subscriber authentication record(s), or any other database, record, or index, may include a security indicator associated with one or more devices. As such, upon detecting a device swap or account transfer, a security indicator can be modified to indicate a low security status for the swapped to device. That is, when credentials are transferred to a new device or reset, the security indicator can be modified from "yes" to "no" indicating that a SSD is to be acquired. By contrast, the HLR and/or other network component which contains data regarding whether a device has a SSD, for example, can be modified from "no" to "yes" when an SSD is obtained.

In embodiments, the service restrictor 206 can reference data (e.g., security indicator indicating a security status) from the HLR 208 to recognize or identify an occurrence of a device swap, an account change, or a low security implementation. The service restrictor 206 can recognize such an occurrence in any manner. For instance, in one implementation, the HLR 208 may provide a security indicator or a modification thereof, to the service restrictor to indicate an occurrence of a device swap. That is, when the HLR 208 recognizes a low security status (e.g., a low security level or a lack of a valid security code) associated with a device or credentials, the HLR 208 may provide a security indication to the service restrictor 206. For example, a security status can be communicated to the service provider 206 when an indication is recognized that a SSD is not established for a device (e.g., because credentials have been transferred to a new device or credentials of a device have been reset requiring a new SSD to be obtained). In another implementation, the service restrictor 206 may query or scan the HLR 208 (e.g., subscriber authentication record or table) for a security indicator or for other data indicating an occurrence of a device swap, account change, or security status.

The HLR 208 can recognize to modify, set, or designate a security indicator (e.g., "no" or "low") based on data obtained by the provisioning system 210. The provisioning system 210 refers to one or more computing devices that can prepare a network to allow it to provide services to users and/or user devices. For example, a business support system (BSS) (now shown so as to not obscure more relevant components) can obtain data that a user account has transferred from association with one device to another device. A BSS includes components that a telecommunication service provider utilizes to run business operations towards customers. In embodiments, a BSS can facilitate taking orders, payment issues, and revenues by way of, for example, product management, customer management, revenue management, and/or order management. A BSS can acquire such data from any number of user interfaces with which customers, service provider representatives (e.g., sales representatives, etc.) can interact and input data. For example, a customer or service provider representative may access a web portal through which data can be entered or modified. Accordingly, a device swap or user account transfer can be detected by recognizing credentials or a user account associated with a new or different device. In other cases, a device swap can be detected by recognizing a resetting of credentials with a device. As can be appreciate, the HLR 208 can obtain or recognize such data from the provisioning system 210 in any manner. For instance, the provisioning system 210 may provide such data to the HLR 208, the HLR 208 may query, monitor, or request such data from the provisioning system 210, etc.

Alternatively or additionally, the service restrictor 206 can reference data (e.g., security indicator, account transfer data, etc.) directly from the provisioning system 210 to recognize or identify an occurrence of a device swap, account transfer, or an implemented security status. The service restrictor 206 can recognize such an occurrence in any manner. For instance, in one implementation, the provisioning system 210 may provide a security status, security indicator, or a modification thereof, to the service restrictor 206 to indicate an occurrence of a device swap or account change. That is, when the provisioning system 210 recognizes a device swap, an account change, or a security status change, the provisioning system 210 may provide such an indication to the service restrictor 206. For example, a security status can be communicated to the service restrictor 206 when an indication is recognized that a SSD is not established for a device (e.g., because credentials have been transferred to a new device or credentials of a device have been reset requiring a new SSD to be obtained). In another implementation, the service restrictor 206 may query or scan the provisioning system 210 for a security status or for other data indicating an occurrence of a device swap. In such an embodiment that service restrictor 206 acquires security status data or account transfer data from the provisioning system 210, the provisioning system 210 or the service restrictor 206 can provide the data to the HLR for retention therein.

In accordance with recognition of a device swap, account change, or a security status indicating a low security level or that no security code is currently obtained in association with a device or credential(s), the service restrictor 206 initiates restriction of services provided to the user device 202, such as voice services and/or data services. Accordingly, the service restrictor 206 can notify the appropriate service(s) or service platforms to restrict services. For instance, the service restrictor 206 may provide a restriction notification to the HLR 208 to restrict voice services. In another example, the service restrictor 206 may provide a restriction notification to an AAA (not shown) to restrict data services. A service platform can be any device or set of devices that performs or facilitates service authentication. Each service might be enforced on a single platform or multiple platforms. For example, the HLR 208 can be a service platform where multiple services are enforced. The service restrictor 206 can notify any number of services platforms, or portions thereof, for which services are to be restricted. Upon receipt of the restriction notification, such service platforms can thereby enforce or apply the restrictions as applicable.

In some cases, all services are automatically restricted in association with the user device. For instance, the service restrictor 206 may notify all available service platforms so that the user device 202 cannot utilize any voice and/or data services. In other cases, a portion of services are restricted in association with the user device. The portion of restricted services can be predetermined and the same for each user device or set of credentials associated with a low security status. For example, all services, except for 911 services, might be restricted; all voice services might be restricted; only international dialing might be restricted, etc. In other cases, the particular services to restrict for a device or set of credentials might be based on the user account or user device. For example, rules or algorithms can be applied to determine frequent recipients of data from the user device and voice calls placed to such recipient(s) may be permitted. The appropriate or particular services to restrict can be identified, for example, using a database or algorithms. That is, the service restrictor 206 can acquire or reference data including, for example, usage patterns, business policies subscribed to, etc. and use such data to identify services to restrict. When a new or modified service is recognized at a BSS (not shown), the service restrictor 206 can be informed (e.g., directly by the BSS or in conjunction with provisioning system 210). As can be appreciated, the service restrictor 206 can store and maintain such a list of provided services and/or restricted services or, alternatively, may access such data stored in a remote component (e.g., BSS or provisioning system).

Upon notification of a service restriction, the service platform, such as the HLR 208, can apply and enforce the restriction. In some cases, when the service platform is notified regarding a restriction, the service platform might notify the user device 202 of the restriction.

Upon implementation of the restrictions, a user device attempting to use a restricted service is denied. That is, a fraudulent device attempting to use the restricted service will be denied the service. Even if the fraudulent device has cloned MSID, MDN, and ESN of a legitimate device, utilization of the service(s) is prevented because the service(s) has been restricted in accordance with a low security status. Such an implementation will prevent fraudulent activity as fraudulent devices are restricted service access during the time between a device swap and acquisition of a valid security code. When the legitimate device attempts to utilize a service, the authentication key associated with the legitimate device can be recognized and used to obtain a valid SSD which, in effect, enables the services to be utilized.

In addition to or in the alternative to restricting services during a low security status time period (e.g., time between device swap and obtaining security code), in accordance with recognition of a device swap, the service restrictor 206 notifies the notification platform 212 of the low security status. The notification platform 212 can provide an authentication notification to the user device 202 to notify the user device 202, or user thereof, to perform or initiate an authentication event. Such a notification may be in the form of a text message indicating to the user to make a call, check voicemail, or any other event that can initiate the authentication protocol (or SSD negotiation) to obtain a valid security code. The notification platform 212 can, in some embodiments, initiate an authentication event by placing a phone call to the user device. In another case, the service platform (HLR) can notify the notification platform, such as a SMS platform, of the low security status such that notification platform 212 initiates an authentication event (e.g., send authentication notice to device or initiate a voice call with device).

Upon receiving an authentication notification, the user device 202 can initiate authentication protocol to obtain a valid security code. Accordingly, the user device may, for instance, initiate a voice call with another user device, initiate a call to voicemail, answer an incoming phone call, or any other action that requires usage of a traffic channel. Performing an authentication event triggers high security as a valid SSD is obtained. In this regard, the user device 202 performs an action that lets the HLR 208 know it is a legitimate device because it has the appropriate authentication key.

Upon initiating the authentication protocol and obtaining a valid security code, the security indicator can be designated as a high security level in the HLR 208. For instance, the security indicator can be modified to "yes" in the HLR indicating a valid SSD has been obtained. In accordance with such a modification, the service restrictor 206 can recognize the change to high security in any manner as previously described, for example, by monitoring the HLR log or index, receiving an indication of a state change from the HLR 208, query the HLR 208 for changes for the subscriber, etc.

When the service restrictor 206 recognizes an authentication event has occurred and the user device has a valid security code, the service restrictor 206 provides a release notification to the service platform(s) the service restrictor 206 previously indicated restricted services. A release notification provides an indication to release the service restriction such that the user device can begin or resume using the previously restricted services. Accordingly, the service restrictor 206 initiates services for the user device by unrestricting the services previously restricted prior to obtaining a SSD.

In this regard, the user device 202 can utilize any services appropriate for such a device. By contrast, a fraudulent device attempting to use the cloned credentials would be denied from services as the high security level applied will not permit use of the services without the valid authentication key and/or SSD. For example, a fraudulent device requesting services using cloned credentials might be denied services at the HLR 208.

Figure 3:
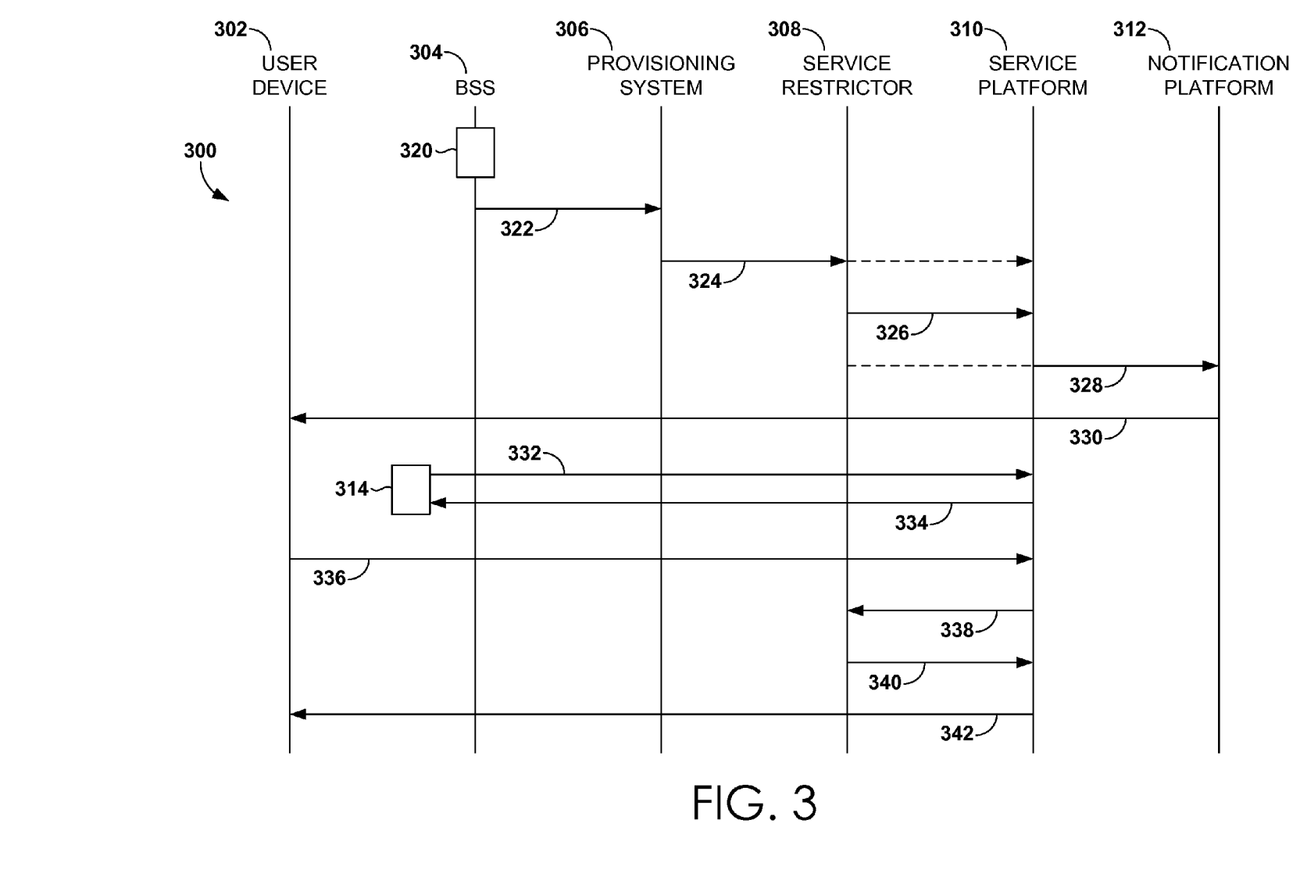
FIG. 3 is a flow diagram for restricting services between an occurrence of an account change and acquisition of a security code, in accordance with an embodiment of the present invention.

By way of example only, and with reference to FIG. 3, FIG. 3 illustrates an exemplary flow diagram for facilitating mitigation of fraudulent activity between an occurrence of a device swap and acquisition of a valid security code. The flow diagram includes a user device 302, a BSS 304, a provisioning system 306, a service restrictor 308, a service platform 310 (e.g., HLR), and a notification platform 312 (e.g., SMS platform). The devices and components depicted within flow diagram 300 are comparable to the device and components of similar name previously discussed with reference to FIG. 2.

Initially, at block 320, the BSS 304 recognizes a change in credentials or user account from one device to another device. Such a change might be initiated by, for example, a user, a fraudster, or a customer representative (e.g., via a store or other contact). For instance, a user, fraudster, or customer representative could modify account information or change account information to another device via a computing device having a user interface. The BSS 304 provides 322 the modification or change to the provisioning system 306. In response, the provisioning system 306 notifies 324 the service restrictor 308 and/or the service platform 310 of such a change. In some embodiments, the service restrictor 308 can notify the service platform 310 regarding the change which can then modify the authentication record to indicate an invalid SSD for the device or credentials. In other embodiments, the provisioning system 306 can notify the service platform 310 and the service platform 310 can notify the service restrictor 308.

Upon recognizing the account change, device swap, or low security implementation at the service restrictor 308, the service restrictor 308 can recognize, identify or determine which services to restrict and initiate such a restriction, as illustrated at 326. Although FIG. 3 illustrates the service restriction applicable to a single service platform 310, as previously described, an indication of the service restriction can be provided to any number of service platforms, or components thereof, to apply service restrictions.

The notification platform 312 is notified 328 to initiate authentication in association with the user device 302. Such a notification 328 can be provided by the service provider 308, the service platform 310, or another component. Based on the notice 328, the notification platform 312 initiates 330 authentication of the user device 302. In embodiments, the notification platform 312 initiates authentication by providing a text message indicating to the user of the user device to place an outgoing call to another user, a particular recipient, a voice message service, etc.

As illustrated in FIG. 3, a cloned device 314 attempting to utilize a service prior to the user device 302 obtaining a security code initiates 332 a voice call. Upon receiving the attempt 332, the service platform 310 rejects 334 the attempt to utilize the voice service.

Now assume that the user device 302 initiates 336 authentication of the user device 302. In some embodiments, such authentication may occur upon receiving the notification provided by the notification platform. For example, a voice call may be initiated by the user device 302. Upon initiation 336 of and completion of authentication to obtain a valid security code, the service platform 310 notifies 338 the service restrictor 308 of such a security status change. As can be appreciated, the service platform 310 can modify the index or data to update such a security status or security indicator. Based on the status change, the service restrictor 308 notifies 340 the service platform 310 to resume services previously restricted in association with the user device and/or credentials. In accordance therewith, the user device 302 is allowed or permitted 342 to utilize services provided by the service platform 310. The details illustrated in this flow diagram are not intended to limit the scope of embodiments of the invention. Rather, many variations of this flow diagram are intended to be within the scope of the invention.

Figure 4:
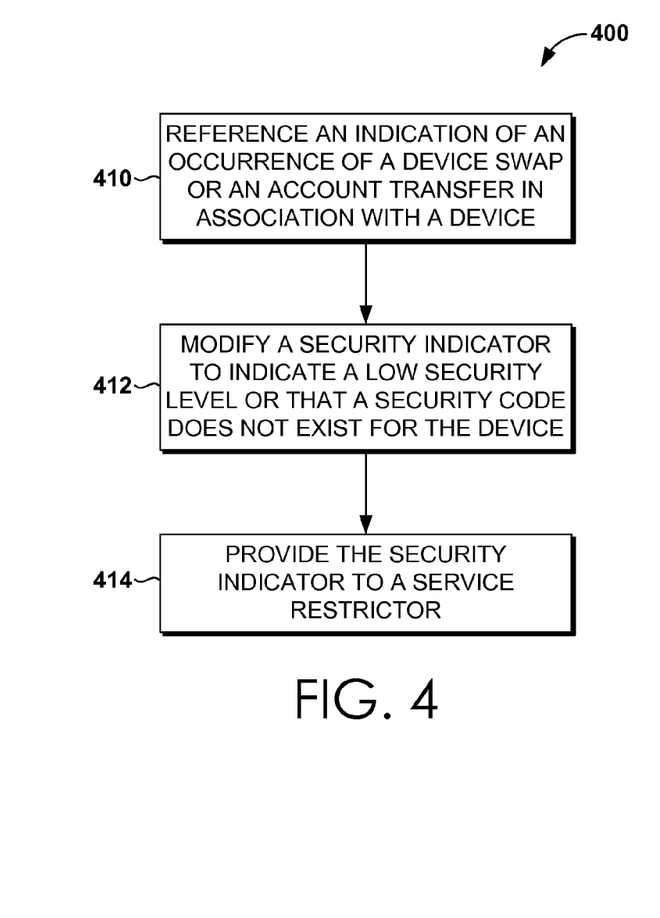
FIG. 4 provides a first exemplary method for restricting services between an occurrence of an account change and acquisition of a security code, in accordance with an embodiment of the present invention.

Turning now to FIG. 4, a flow diagram is shown illustrating a first exemplary method 400 for restricting services between an occurrence of an account change and acquisition of a security code, in accordance with an embodiment of the present invention. In embodiments, method 400 can be performed using a service providing component, such as the HLR 208 illustrated in FIG. 2.

Initially, at block 410, an indication that a device swap or an account transfer occurred is referenced. As such, transferring user account data, such as device credentials, from one device to another device is recognized. In some embodiments, such an indication can be received or retrieved via a provisioning system that maintains user account data. Thereafter, at block 412, based on the occurrence of the device swap or the account transfer, a security indicator associated with newly swapped to device, or credentials associated therewith, is designated or modified to indicate a low security level or that a security code does not currently exist for the user device, or credentials associated therewith. At block 414, the security indicator is provided to a service restrictor such that the service restrictor can restrict services provided in association with the user device or associated credentials when the low security status exists or the security code does not exist or is invalid.

Figure 5:
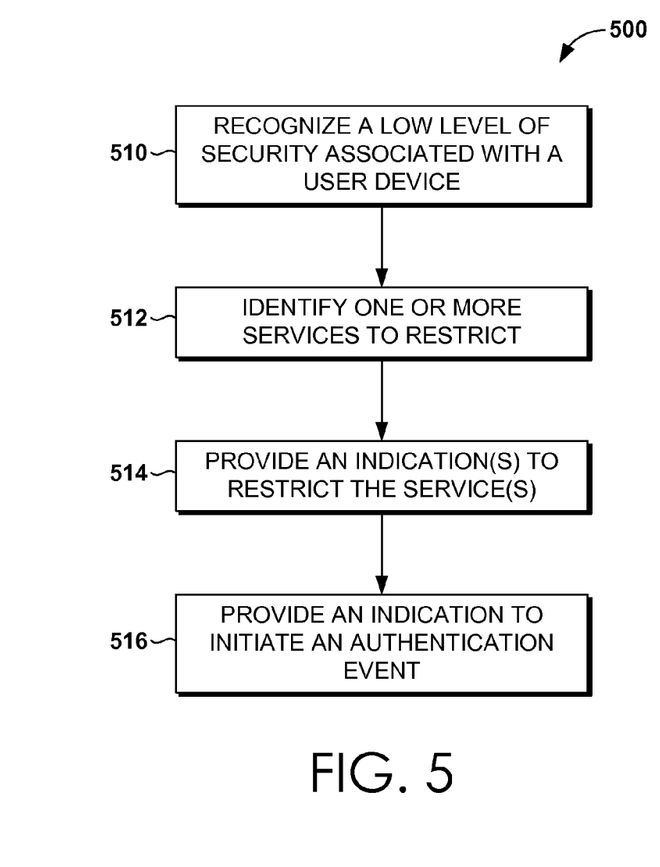
FIG. 5 provides a second exemplary method for restricting services between an occurrence of an account change and acquisition of a security code, in accordance with an embodiment of the present invention.

With reference to FIG. 5, a flow diagram is shown illustrating a second exemplary method 500 for restricting services between an occurrence of an account change and acquisition of a security code, in accordance with an embodiment of the present invention. In embodiments, method 500 can be performed using a service restrictor, such as the service restrictor 206 illustrated in FIG. 2.

Initially, as indicated at block 510, a low level of security associated with a user device, or a set of credentials associated therewith, is recognized. A low level security can be recognized, for example, based on a security indicator provided from or otherwise referenced from a service platform containing security status for various devices. For instance, such a security indicator may indicate "high" or "low" to indicate a level of security or may indicate "yes" or "no" to indicate whether a valid security code is currently acquired. Subsequently, at block 512, in accordance with the low level of security, one or more services to restrict in association with the user device are identified. An indication to restrict the service(s) for the user device is provided, as indicated at block 514. In embodiments, an indication(s) is provided to the appropriate service(s) platform that provides or enforces the service. At block 516, an indication to initiate an authentication event is provided. For example, an indication to initiate an authentication event can be provided to a notification platform, such as a SMS platform that can provide a notification to the user device. Performance of such an authentication event results in the user device, or the set of credentials associated therewith, obtaining a security code that results in application of an increased level of security in effect in association with the user device, or the set of credentials associated therewith.

Figure 6:
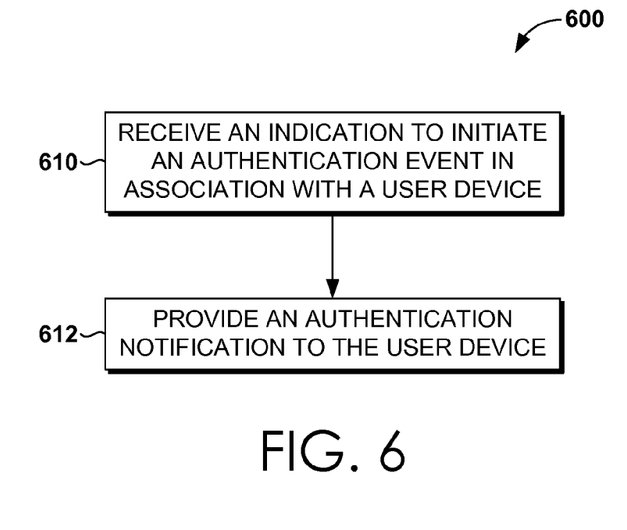
FIG. 6 provides a third exemplary method for restricting services between an occurrence of an account change and acquisition of a security code, in accordance with an embodiment of the present invention.

Turning now to FIG. 6, a flow diagram is shown illustrating a third exemplary method 600 for restricting services between an occurrence of an account change and acquisition of a security code, in accordance with an embodiment of the present invention. In embodiments, method 600 can be performed using a notification platform component, such as the notification platform 212 illustrated in FIG. 2.

Initially, as indicated at block 610, an indication to initiate an authentication event in association with a user device is received. Thereafter, at block 612, an authentication notification is provided to the user device. For example, a SMS platform can provide a notification to the user device to request the user of the user device to initiate or perform an authentication event. Performance of such an authentication event results in the user device, or the set of credentials associated therewith, obtaining a security code that results in application of an increased level of security in effect in association with the user device, or the set of credentials associated therewith.

Figure 7:
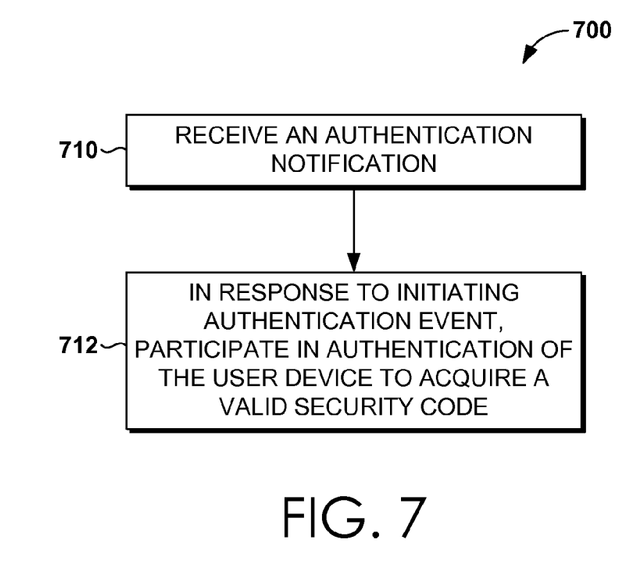
FIG. 7 provides a fourth exemplary method for restricting services between an occurrence of an account change and acquisition of a security code, in accordance with an embodiment of the present invention.

Turning now to FIG. 7, a flow diagram is shown illustrating a fourth exemplary method 700 for restricting services between an occurrence of an account change and acquisition of a security code, in accordance with an embodiment of the present invention. In embodiments, method 700 can be performed using a user device, such as the user device 202 illustrated in FIG. 2.

Initially, as indicated at block 710, an authentication notification is received that requests initiation of an authentication event to initiate authentication of the user device. Such an authentication notification can be provided to the user device based on the user device being void of a valid security code. Subsequently, in response to initiation of the authentication event, participation in authentication of the user device is performed to acquire a valid security code in association with the user device. This is indicated at block 712. For example, upon detecting an initiated voice call, the user device partakes in authentication to acquire a valid security code associated with the user device.

It will be understood by those of ordinary skill in the art that the order of steps shown in the method 400 of FIG. 4, method 500 of FIG. 5, method 600 of FIG. 6, and method 700 of FIG. 7 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for restricting mobile device services between an occurrence of an account change and an acquisition of a security code, the system comprising:
   a service restrictor configured to:
      recognize a change in status of a user device, wherein the change in status comprises one or more of a device swap, an account change, a low security implementation, or a lack of a security code;
      provide an indication to restrict one or more voice or data services for the user device in response to the recognition of the change in status, and
      provide an indication to initiate authentication for the user device within a wireless telecommunications network; and
   a notification component configured to receive the indication to initiate authentication for the user device and, in response, initiate authentication for the user device by placing a voice call to the user device or communicating an authentication notification to the user device prompting a user of the user device to initiate a voice call.

2. The system of claim 1, wherein the security code comprises a secured secret data (SSD) value.

3. The system of claim 1, wherein the service restrictor recognizes the change in status of the user device based on referencing a security indicator associated with the user device that indicates a low security implementation.

4. The system of claim 1, wherein the service restrictor recognizes the change in status of the user device based on referencing a security indicator associated with the user device that indicates a valid secured secret data value does not currently exist for the user device.

5. The system of claim 4, wherein the security indicator is provided from a home location register that stores a status of whether the valid secured secret data value currently exists for the user device.

6. The system of claim 5, wherein the home location register updates the status of whether the valid secured secret data value currently exists for the user device when a device swap or user account change is detected.

7. The system of claim 1, wherein the service restrictor identifies the one or more voice or data services to restrict.

8. The system of claim 1, wherein after the authentication of the user device occurs, the service restrictor is further configured to
   recognize an indication of authentication associated with the user device; and
   provide an indication to unrestrict the one or more voice or data services for the user device based on the indication of authentication.

9. The system of claim 8, wherein the service restrictor recognizes that the security code is associated with the user device based on referencing a security indicator associated with the user device that indicates a valid secured secret data value does exist for the user device, the security indicator being provided from a home location register that stores a status of whether the valid secured secret data value currently exists for the user device.

10. One or more non-transitory computer-readable storage media having computer-executable instructions embodied thereon that, when executed, perform a method for restricting mobile device services between an occurrence of an account change and an acquisition of a security code, the method comprising:
   recognizing a change in status of a user device, wherein the change in status comprises one or more of a device swap, an account change, a low security implementation, or a lack of a security code;
   providing an indication to restrict one or more voice or data services for the user device in response to the recognition of the change in status; and
   providing an indication to initiate authentication for the user device within a wireless telecommunications network, wherein initiating authentication for the user device is performed by placing a voice call to the user device or communicating an authentication notification to the user device prompting a user of the user device to initiate a voice call.

11. The media of claim 10, wherein the security code comprises a secured secret data (SSD) value.

12. The media of claim 10, wherein recognizing the change in status of the user device further comprises referencing a security indicator associated with the user device that indicates a low security implementation.

13. The media of claim 10, wherein recognizing the change in status of the user device further comprises referencing a security indicator associated with the user device that indicates a valid secured secret data value does not currently exist for the user device.

14. The media of claim 13, further comprising providing the security indicator from a home location register that stores a status of whether the valid secured secret data value currently exists for the user device.

15. The media of claim 14, further comprising updating the status of whether the valid secured secret data value currently exists for the user device in response to detection of a device swap or user account change.

16. The media of claim 10, further comprising identifying the one or more voice or data services to restrict.

17. A method for restricting mobile device services between an occurrence of an status change and an authentication event, the method comprising:
    recognizing a change in status of a user device, wherein the change in status comprises one or more of a device swap, an account change, a low security implementation, or a lack of a security code;
    based on the recognition of the change in status of the user device, providing an indication to restrict one or more voice or data services for the user device; and
    providing an indication to initiate an authentication event, wherein initiation of the authentication event results in placement of a voice call to the user device or communicating an authentication notification to the user device prompting a user of the user device to initiate a voice call.

18. The method of claim 17, wherein a change in status further includes an indication that one or more credentials of the user device has been reset.

19. The method of claim 17, further comprising receiving an indication of the performance of the authentication event.

20. The method of claim 19, further comprising providing an indication to unrestrict the one or more voice or data services for the user device based on the indication of performance of the authentication event.

* * * * *